(12) United States Patent
Jiang et al.

(10) Patent No.: US 7,854,391 B2
(45) Date of Patent: Dec. 21, 2010

(54) FLOW REGULATING ARTICLES AND METHODS OF MANUFACTURE

(75) Inventors: Liang Jiang, Guilderland, NY (US); Don M. Lipkin, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 900 days.

(21) Appl. No.: 11/412,444

(22) Filed: Apr. 27, 2006

(65) Prior Publication Data
US 2007/0252014 A1    Nov. 1, 2007

(51) Int. Cl.
*G05D 23/02* (2006.01)

(52) U.S. Cl. .................... 236/101 A; 236/98

(58) Field of Classification Search .......... 236/94, 236/97, 98, 101 A, 101 R
See application file for complete search history.

(56) References Cited

U.S. PATENT DOCUMENTS

| | | | | |
|---|---|---|---|---|
| 4,848,653 A | * | 7/1989 | Van Becelaere | 236/49.3 |
| 5,325,880 A | * | 7/1994 | Johnson et al. | 137/1 |
| 5,839,467 A | * | 11/1998 | Saaski et al. | 137/501 |
| 6,079,474 A | * | 6/2000 | Lin | 160/370.22 |
| 6,258,115 B1 | * | 7/2001 | Dubrul | 606/200 |
| 6,729,599 B2 | * | 5/2004 | Johnson | 251/11 |
| 6,779,963 B2 | | 8/2004 | Kang | |
| 2004/0111142 A1 | * | 6/2004 | Rourke et al. | 623/1.1 |
| 2005/0207896 A1 | | 9/2005 | Gigliotti, Jr. et al. | |
| 2006/0015138 A1 | * | 1/2006 | Gertner | 606/200 |
| 2006/0048936 A1 | * | 3/2006 | Fripp et al. | 166/244.1 |

* cited by examiner

Primary Examiner—Marc E Norman
(74) Attorney, Agent, or Firm—Paul J. DiConza

(57) ABSTRACT

A flow regulating article is provided. The flow regulating article, in an exemplary embodiment, includes a patterned structure. The patterned structure includes a shape memory alloy capable of changing shape at predetermined temperatures.

12 Claims, 3 Drawing Sheets

FLOW REGULATING ARTICLES AND METHODS OF MANUFACTURE

BACKGROUND OF THE INVENTION

This invention relates generally to fluid flow regulating articles, and more particularly, to flow regulating articles that include shape memory alloys.

Air and other gaseous or liquid fluids, for example water or oil, are sometimes used for cooling structures when operating at elevated temperatures. The amount of fluid flow and the temperature of the cooling fluid can effect the rate of cooling of the structure. Typically, the fluid flow is controlled to increase at elevated operating temperatures to maintain the structure at or below predetermined maximum temperatures.

Known flow regulating systems include at least one sensor to monitor environmental changes. Flow regulation is typically provided by the use of hydraulic and/or pneumatic actuation systems. The control of the actuation systems is accomplished by electronic systems coupled to the sensors. These known flow regulating systems add complexity and cost to the overall system.

BRIEF DESCRIPTION OF THE INVENTION

In one aspect, a flow regulating article is provided. The flow regulating article comprises a patterned structure. The patterned structure includes a shape memory alloy capable of changing shape at predetermined temperatures.

In another aspect, a method of manufacturing a flow regulating article is provided. The method includes forming a patterned structure. The patterned structure includes a shape memory alloy capable of changing shape at predetermined temperatures.

DETAILED DESCRIPTION OF THE INVENTION

Flow regulating articles and methods of manufacturing these flow regulating articles are described in detail below. The flow regulating article, in an exemplary embodiment, includes a patterned structure. The patterned structure includes a shape memory alloy member capable of actively or passively changing shape at predetermined environmental temperatures, for example, by environmental or other external stimuli such as electrical resistance heating, flow heating, and the like. The flow regulating articles use shape memory alloys to regulate fluid flow without the use of complex sensors, control systems, and/or actuation systems, including hydraulic and/or pneumatic actuation systems. Patterned features in the flow regulating articles coupled with shape memory alloys provide a system that senses environmental change, for example, temperature change, and that passively controls fluid flow by utilizing the ability of the shape memory alloy to change shape at targeted temperatures. Moreover, the flow regulating articles can actively control cooling fluid via external stimuli as desired. Manufacturing methods can utilize micro machining and manufacturing technology to fabricate patterned features, for example, holes, or other desirable shapes, in the flow regulating articles to enhance the effectiveness of flow regulation. The flow regulating articles utilize modular materials systems that can be assembled into a functional component, a device, and a structural component. The flow regulating articles can simulate the thermoregulation functions of the skin of a human body by utilizing a shape memory alloy's shape memory properties for sensing environmental change and for actuation to regulate flow. The flow regulating articles utilize an autonomous shape memory alloy material system that has fast, on-demand, and location-specific response.

Figure 1:
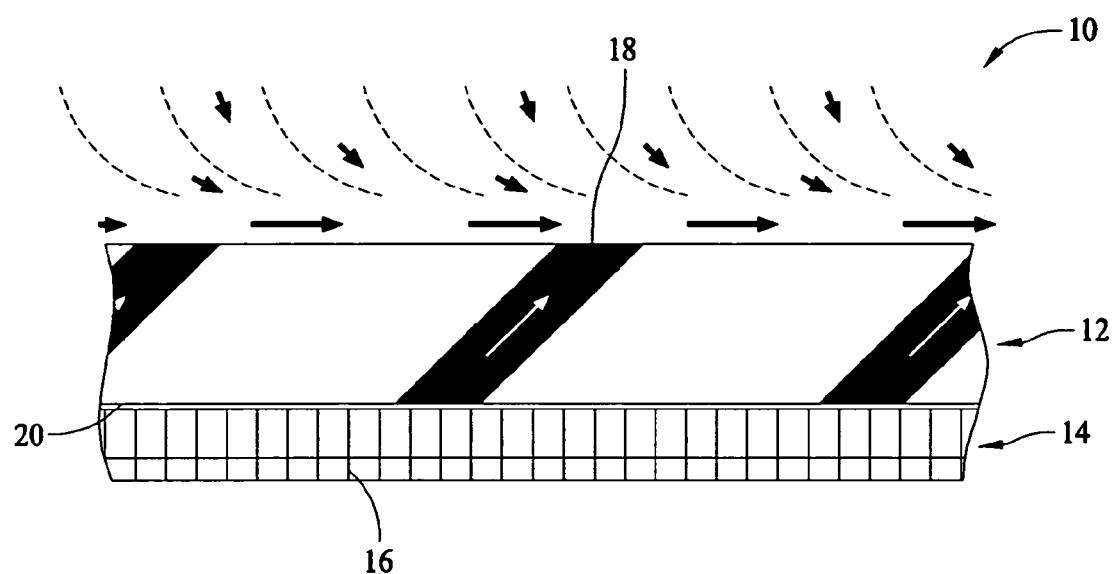
FIG. 1 is a schematic illustration of a flow regulating article at a baseline temperature in accordance with an embodiment of the present invention.
Figure 2:
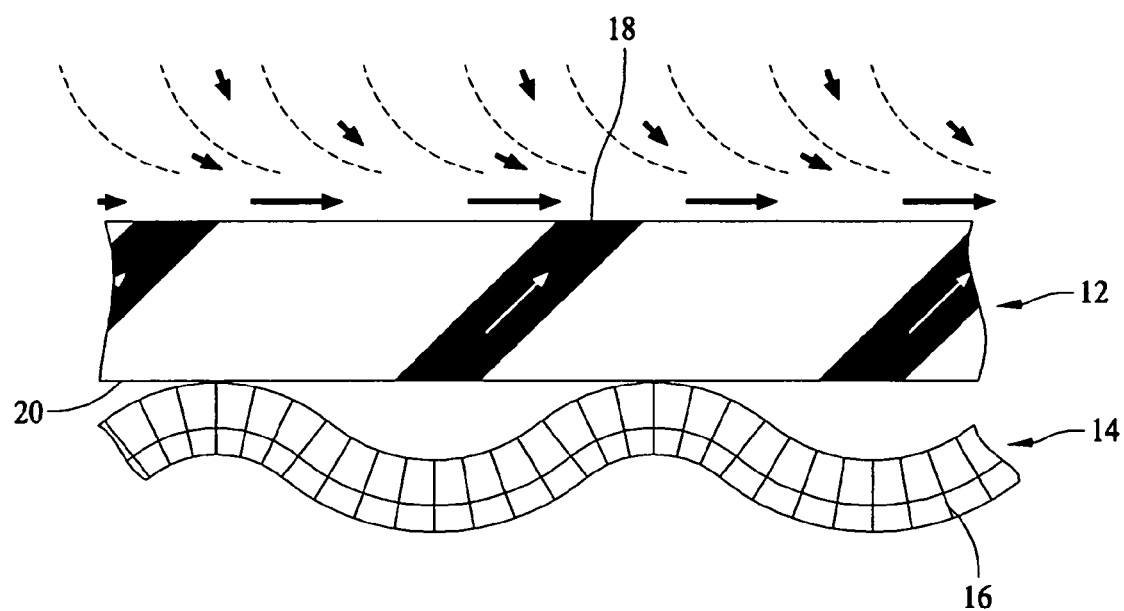
FIG. 2 is a schematic illustration of the flow regulating article shown in FIG. 1 at an elevated temperature.
Figure 3:
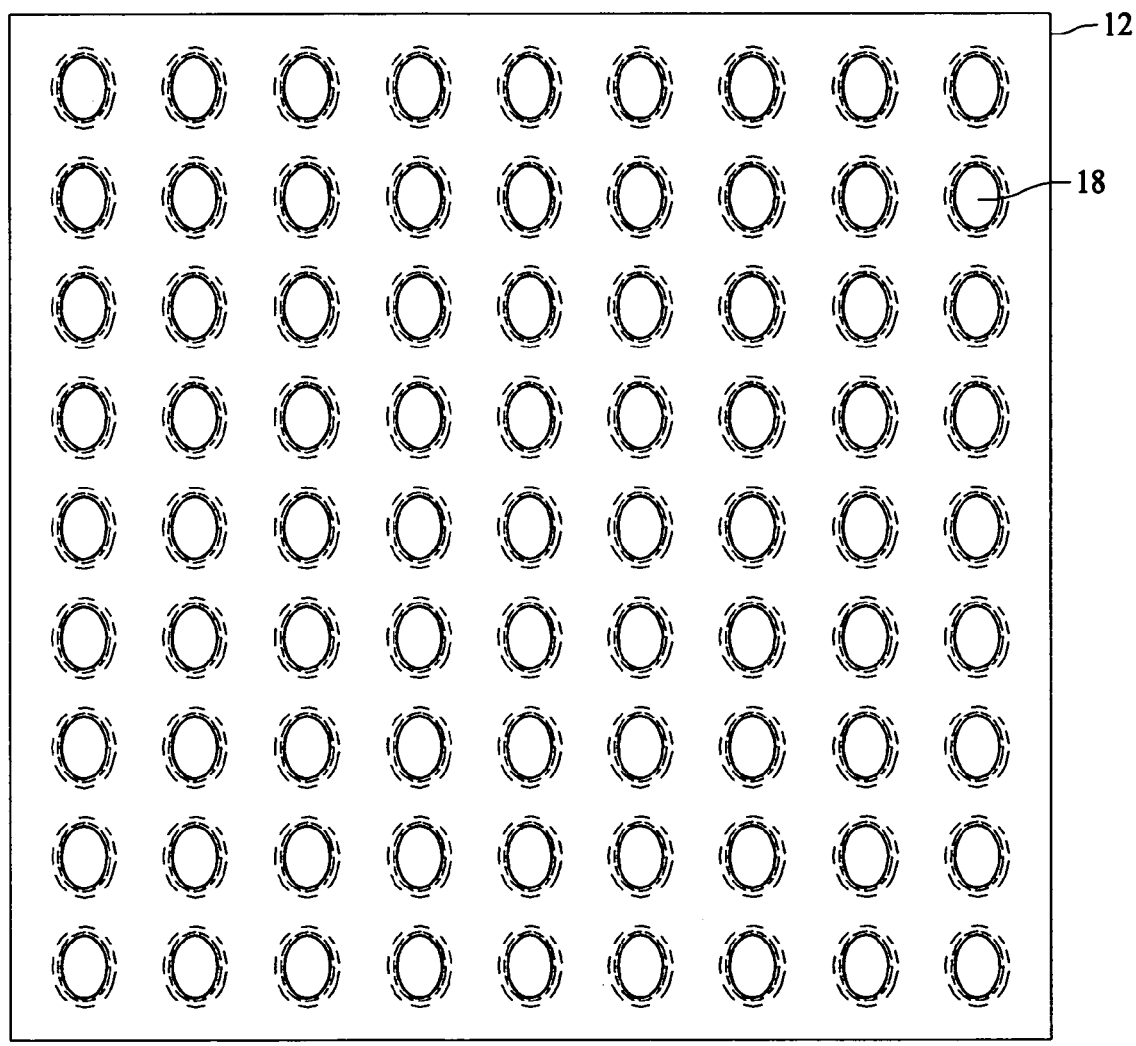
FIG. 3 is an enlarged view of a portion of the top surface of the flow regulating article shown in FIG. 1.

Referring to the drawings, FIG. 1 is a schematic illustration of a flow regulating article 10 at a baseline temperature in accordance with an exemplary embodiment of the present invention, and FIG. 2 is a schematic illustration of flow regulating article 10 at an elevated temperature. Referring to FIGS. 1 and 2, flow regulating article 10 includes a patterned structure 12 and a shape memory alloy member 14 constrained by a biasing element 16, for example a metallic or polymeric spring, a nonlinear elastic polymer member, or a super-elastic shape memory alloy member. Patterned structure 12 includes a plurality of cooling channels 18 arranged in a pattern in structure 12, for example, as shown in FIG. 3. As shown in FIG. 1, at a normal or baseline temperature, shape memory alloy member 14 is adjacent to a bottom surface 20 of structure 12 and permits a low flow of cooling fluid through cooling channels 18. As shown in FIG. 2, at an elevated temperature, the shape memory alloy of member 14 has contracted, for example about 1 percent to about 10 percent, and elastically deflects biasing element 16. In this configuration, cooling channels become unobstructed, permitting a greater flow of cooling fluid through cooling channels. When the environmental temperature cools to the lower or baseline temperature, the shape memory alloy returns to its original shape, via a biasing force from biasing element 16, causing member 14 to return to its original position shown in FIG. 1.

Patterned structure 12 can be formed from any suitable material, for example, but not limited to, Ti-based alloys, Ni-based alloys, Co-based alloys, Fe-based alloys, Al-based alloys, polymeric materials, and the like. The pattern of cooling channels 18 can be formed in structure 12 by any suitable micromachining technique, for example, but not limited to, photolithographic etching, laser micromachining techniques, electron beam micromachining techniques, electrochemical micromachining techniques, electrodischarge micromachining techniques, and combinations thereof.

Shape memory alloys can exist in one of several distinct temperature-dependent phases. The most commonly utilized of these phases are the so-called martensite and austenite phases. Upon heating through the transformation temperature, a shape memory alloy changes from the martensite phase into the austenite phase. The temperature at which this phenomenon starts is referred to as the austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which the alloy finishes transforming to the martensite phase is called the martensite finish temperature ($M_f$). Generally, the shape memory alloys are soft and compliant in their martensitic phase and are hard and stiff in the austenitic phase.

Shape memory alloys can exhibit a one-way shape memory effect, an intrinsic two-way shape memory effect, or an extrinsic two-way shape memory effect, depending on the alloy composition and processing history. Annealed shape memory alloys typically exhibit the one-way shape memory effect. Heating subsequent to low-temperature (below $M_f$) deformation of the shape memory material will induce the martensite to austenite transition, and the material will recover the remembered, high-temperature (above $A_f$) shape. Upon cooling through the austenite to martensite temperature, the alloy will not change shape. Hence, one-way shape memory effects are only observed upon heating.

Intrinsic and extrinsic two-way shape memory materials are characterized by a shape transition both upon heating from the martensite phase to the austenite phase, as well as upon cooling from the austenite phase back to the martensite phase. Shape memory alloy structures that exhibit an intrinsic two-way shape memory effect are fabricated from a shape memory alloy composition that will revert to its "remembered" low-temperature shape. Intrinsic two-way shape memory behavior is imparted by training the shape memory material through processing. Such processing can include extreme deformation of the material while in the martensite phase, heating-cooling under constraint or load, or surface modification such as laser annealing, or shot-peening. Once the material has been trained to exhibit the two-way shape memory effect, the shape change between the low and high temperature states is generally reversible and persists through a high number of thermal cycles. In contrast, structures that exhibit the extrinsic two-way shape memory effects are composite or multi-component materials that combine a shape memory alloy composition that exhibits a one-way effect with another element that provides an elastic restoring force to return the structure to its original shape on cooling.

Shape memory alloys can exhibit superelastic behavior. Superelastic behavior results if the shape memory alloy is deformed at a temperature that is slightly above its transformation temperature, $A_s$, with a stress or strain level within its recoverable range. The superelastic effect is caused by a stress-induced transformation of some martensite above its normal temperature, $M_s$. Because it has been formed above its normal temperature, the martensite reverts immediately to an undeformed austenite when the stress is removed. As such, the shape memory alloy article can exhibit "rubber-like" elasticity. In addition, superelastic shape memory alloys can be strained several times more than ordinary metal alloys without being plastically deformed. Superelastic behavior, however, is only observed over a specific temperature range. The highest temperature at which martensite can no longer be stress induced is generally called $M_d$. Above $M_d$, shape memory alloys remain austenitic and are deformed and hardened like ordinary materials by dislocation, motion and multiplication. Below $A_s$, the material is martensitic and exhibits no superelasticity. Thus, superelasticity appears in a temperature range from near $A_s$, to $M_d$. The largest ability to recover occurs close to $A_f$.

Suitable shape memory alloy materials include, but are not intended to be limited to, nickel-titanium based alloys, nickel-titanium-platinum based alloys, nickel-titanium-palladium based alloys, nickel-titanium-hafnium based alloys, nickel-titanium-zirconium based alloys, indium-titanium based alloys, nickel-aluminum based alloys, nickel-platinum-aluminum based alloys, nickel-gallium based alloys, copper based alloys (e.g., copper-zinc alloys, copper-aluminum alloys, copper-gold alloys, and copper-tin alloys), gold-cadmium based alloys, silver-cadmium based alloys, indium-cadmium based alloys, manganese-copper based alloys, iron-platinum based alloys, iron-palladium based alloys, ruthenium-niobium based alloys, ruthenium-tantalum based alloys, titanium based alloys, iron-based alloys, and the like. The alloys can be binary, ternary, or any higher order so long as the alloy composition exhibits a shape memory effect upon heating or cooling through the martensite/austenite phase transition temperatures or a superelastic effect upon stress or strain induced phase transition. Selection of a suitable shape memory alloy composition depends on the temperature range where the component will operate and other property requirements characteristic to the specific application.

The term "shape memory alloy" is also intended to include shape memory alloy composites, wherein the shape memory alloy based composite comprises a matrix of shape memory alloy and at least one hard particulate phase. The hard particulate phase comprises borides, oxides, nitrides, carbides, or combinations comprising at least one of the foregoing particulates. In alternate embodiments, the shape memory alloy composites comprises a multilayer structure of the shape memory alloy alternating with a metallic or a ceramic layer. The ceramic layer is selected from the group consisting of borides, oxides, nitrides, and carbides. The metallic layer is selected from the group consisting of Ti, Ni, Co, Ti-based alloys, Ni-based alloys, Co-based alloys, Fe-based alloys, particles or fibers of the shape memory alloy in a polymeric matrix, and the like. Further, shape memory alloy composites can include multilayers of shape memory alloy with superelastic shape memory alloy.

In yet another alternative embodiment, the composite may further include ultra-fine grained materials such as may be produced by severe plastic deformation processes generally known by those skilled in the art. For example, suitable severe plastic deformation processes for obtaining the desired grains sizes include, but are not intended to be limited to, ball milling, impact deformation, shot peening, high pressure torsion processing, and the like. Preferred grain sizes are less than 1 micrometer, with grain sizes less than 0.1 micrometer more preferred. Suitable ultra-fine grained materials are characterized by high hardness, resistance to recrystallization, slow grain growth upon annealing, and low dislocation density interior of grains.

The shape memory alloy can be affixed to flow regulating article 12 by method of mechanical, adhesive, or metallurgical bonding. The specific method of metallurgical bonding will depend on shape memory alloy composition, the composition of the flow regulating article, as well as other design and application parameters. Suitable methods include, but are not intended to be limited to, brazing, fusion welding, solid-state welding, deformation induced joining by co-extrusion or co-forging, diffusion bonding (explosion bonding, hot-isotactic-pressing), cladding (laser, electron beam, plasma transfer arc), physical vapor deposition (sputtering, ion plasma, electron beam), thermal spraying (vacuum, air plasma, cold spraying, high-velocity oxy-fuel), and the like. In another embodiment, the shape memory alloy can be formed into an insert and/or coupon, which can then be attached to flow regulating article 12. In another embodiment, flow regulating article 12 is formed directly from the shape memory alloy.

Figure 4:
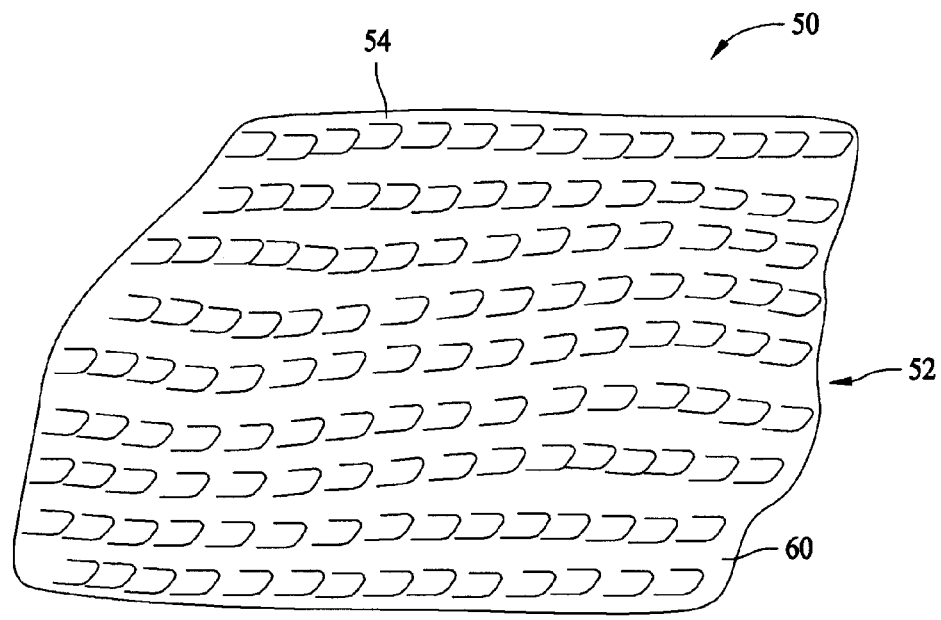
FIG. 4 is a schematic illustration of a flow regulating article in accordance with another embodiment of the present invention.
Figure 5:
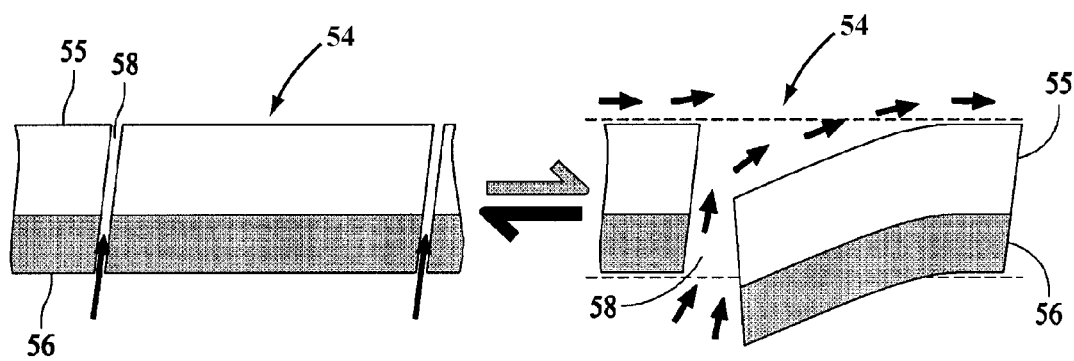
FIG. 5 is a schematic illustration of the flow regulating article shown in FIG. 4 at a baseline temperature and at an elevated temperature.

FIG. 4 is a schematic illustration of a self actuating flow regulating article 50 in accordance with another exemplary embodiment of the present invention and FIG. 2 is a sectional schematic illustration of self actuating flow regulating article 50 at a base temperature and at an elevated temperature. Referring to FIGS. 4 and 5, flow regulating article 50 includes a patterned structure 52. Patterned structure 52 includes a plurality of louvers 54 arranged in a pattern in structure 52. Patterned structure 52 is a composite that includes an elastic (or superelastic) membrane layer 55 joined to a shape memory alloy layer 56. The left side of FIG. 5 shows structure 52 at a base temperature with louvers 54 in a closed position. Louvers 54 include flow channels 58 which permit some flow of fluid through louvers 54 at the base temperature. The right side of FIG. 5 shows structure 52 at an elevated temperature where shape memory alloy layer 56 has changed shape due to the elevated temperature which moves louvers 54 into an open position with flow channels enlarged (larger flow area) to permit a high flow rate through structure 52. When the temperature returns to the base temperature, shape memory alloy layer 56 is restored to the position shown on the left side of FIG. 5 by elastic membrane layer 55. In another exemplary embodiment, flow regulating article 50 has a smooth outer surface 60 at the base temperature and a rough outer surface at the elevated temperature. The change in surface roughness alters the surface drag coefficient and changes the fluid flow over outer surface 60 which changes the heat transfer coefficients.

The activation of the shape memory alloy can occur by environmental conditions (passive), for example, changes in temperature or pressure. Also, the activation of the shape memory alloy can be actively accomplished by external heat sources that a user can raise and/or lower. Examples of external heat sources include, but are not limited to, electrical elements, electric current passing through the shape memory alloy, radiant heat sources. Further, the shape memory alloy configurations described above which are in a closed position (or base line position) at a base line temperature and then open when heated can be configured to be open at the base line temperature and then close when heated.

The flow regulating articles and methods of manufacture are not limited to the specific embodiments described herein. In addition, components of each flow regulating article and each method described can be practiced independent and separate from other components and methods described herein. Each component and methods also can be used in combination with other assembly packages and methods.

While the invention has been described in terms of various specific embodiments, those skilled in the art will recognize that the invention can be practiced with modification within the spirit and scope of the claims.

What is claimed is:

1. A flow regulating article comprising a patterned structure, said patterned structure comprising a shape memory alloy capable of changing shape at predetermined temperatures, said patterned structure comprising a plurality of flow channels extending through said structure including said shape memory alloy and arranged in a predetermined pattern in a surface of said shape memory alloy, each said flow channel having a first flow area at a first temperature and a second flow area at a second temperature wherein said second temperature is greater than said first temperature;
wherein said plurality of flow channels comprises a plurality of louvers formed in said shape memory alloy and arranged in a predetermined pattern, said plurality of louvers configured in a closed position at a first temperature and in an open position at a second temperature, to provide a higher fluid flow through said patterned structure.

2. The flow regulating article in accordance with claim 1 wherein each said flow channel changes from said first flow area at said first temperature to said second flow area at said second temperature and back to said first area when returned to said first temperature.

3. The flow regulating article in accordance with claim 1 wherein said patterned structure further comprising an elastic membrane coupled to said shape memory alloy.

4. The flow regulating article in accordance with claim 1, wherein said second temperature is higher than said first temperature.

5. The flow regulating article in accordance with claim 1 wherein said shape memory alloy comprises at least one of nickel-titanium based alloys, nickel-titanium-platinum based alloys, indium-titanium based alloys, nickel-aluminum based alloys, nickel-aluminum-platinum based alloys, nickel-gallium based alloys, copper based alloys, gold-cadmium based alloys, iron -platinum based alloys, iron-palladium based alloys, silver-cadmium based alloys, indium-cadmium based alloys, manganese-copper based alloys, ruthenium-niobium based alloys, and ruthenium-tantalum based alloys.

6. A method of manufacturing a flow regulating article, said method comprising:
forming a patterned structure, said patterned structure comprising a shape memory alloy capable of changing shape at predetermined temperatures, the patterned structure having a plurality of flow channels extending through the structure including the shape memory alloy and arranged in a predetermined pattern, each of the flow channels having a first flow area at a first temperature and a second flow area at a second temperature, wherein the second temperature is greater than said first temperature;
wherein said forming a patterned structure comprises forming a patterned structure having a plurality of louvers formed in the shape memory alloy and arranged in a predetermined pattern, the plurality of louvers configured in a closed position at a first temperature and in an open position at a second temperature, to provide added fluid flow through the patterned structure.

7. The method in accordance with claim 6 wherein each flow channel changes from the first flow area at the first temperature to the second flow area at the second temperature and back to the first area when returned to the first temperature.

8. The method in accordance with claim 6 wherein forming a patterned structure further comprises coupling an elastic membrane to the shape memory alloy, the plurality of flow channels further extending through the elastic membrane.

9. The method in accordance with claim 6 wherein the second temperature is higher than the first temperature.

10. The method in accordance with claim 6 wherein said shape memory alloy comprises at least one of nickel-titanium based alloys, nickel-titanium-platinum based alloys, indium-titanium based alloys, nickel-aluminum based alloys, nickel-aluminum-platinum based alloys, nickel-gallium based alloys, copper based alloys, gold-cadmium based alloys, iron -platinum based alloys, iron-palladium based alloys, silver-cadmium based alloys, indium-cadmium based alloys, manganese-copper based alloys, ruthenium-niobium based alloys, and ruthenium-tantalum based alloys.

11. The method in accordance with claim 6 wherein said forming a patterned structure comprises forming the patterned structure using at least one micromachining technique.

12. The method in accordance with claim 11 wherein said at least one micromachining technique comprises at least one of laser micromachining techniques, electron beam micromachining techniques, electrochemical micromachining techniques, electrodischarge micromachining techniques, and photolithographic etching techniques.

\* \* \* \* \*

UNITED STATES PATENT AND TRADEMARK OFFICE
CERTIFICATE OF CORRECTION

| | |
|---|---|
| PATENT NO. | : 7,854,391 B2 |
| APPLICATION NO. | : 11/412444 |
| DATED | : December 21, 2010 |
| INVENTOR(S) | : Jiang et al. |

It is certified that error appears in the above-identified patent and that said Letters Patent is hereby corrected as shown below:

In Column 1, Line 12, delete "effect" and insert -- affect --, therefor.

In Column 3, Line 57, delete "$A_s$," and insert -- $A_s$ --, therefor.

In Column 6, Line 13, in Claim 5, delete "iron -platinum" and insert -- iron-platinum --, therefor.

In Column 6, Line 53, in Claim 10, delete "iron -platinum" and insert -- iron-platinum --, therefor.

Signed and Sealed this
Twelfth Day of April, 2011

David J. Kappos
*Director of the United States Patent and Trademark Office*